Patented Apr. 15, 1941

2,238,546

UNITED STATES PATENT OFFICE 2,238,546

CARCASS TREATMENT

Beverly E. Williams and Andrew S. Hartanov, Chicago, Ill., assignors to Industrial Patents Corporation, Chicago, Ill., a corporation of Delaware No Drawing. Application June 13, 1939,
Serial No. 278,906

7 Claims. (Cl. 99—174)

This invention relates to the treatment of the carcasses of calves.

One of the objects of the invention is to provide an improved method for dressing calves.

Another object of the invention is to provide a method whereby calves may be skinned promptly after slaughter before the animal heat has been dissipated.

Other objects of the invention will be apparent from the description and claims which follow.

Due to the highly perishable character of calf carcasses, many calves are delivered to the retail butcher unskinned. The surface of a skinned calf carcass is not protected by a layer of fat such as is found on beef carcasses and is readily susceptible to bacterial contamination. The surface of a skinned calf carcass rapidly loses the bloom and appearance characteristic of freshly dressed, freshly skinned calf carcasses, with the result that the product is graded down and necessarily sold at a lower price.

Butchers located in the immediate vicinity of an abattoir may purchase skinned calves in relatively good condition. In Patent No. 2,076,053 we disclose a method whereby calves may be skinned in the abattoir, shipped to remote points and arrive in prime condition. Although calves may be washed before slaughter, necessarily there is much filth in the hair of a calf which would contaminate edible product unless great care is taken in removing the skin.

As has been pointed out, it is conventional to ship calf carcasses without removing the skin. The invention described and claimed in Patent No. 2,076,053 provides a method whereby such skins may be removed at the abattoir. However, due to the nature of a calf carcass, it has always been deemed necessary in the industry to remove the skin after the calf carcass is thoroughly chilled. This procedure is termed "cold skinning." Although beef carcasses are always hot skinned in conventional practice, the exact opposite is true of calf carcasses.

The present invention provides a method whereby calf carcasses may be hot skinned, that is, the skin may be removed immediately after slaughter and before the animal heat has been dissipated without adversely affecting the appearance and condition of the surface of the skinned calf carcass.

Calves chilled with the hide on are better in condition and appearance than calves which have been hot skinned because of the protection offered by the hide against air, drying out and consequent darkening and because the insulating qualities of the skin and the hair retard the rapidity of chill on the surface.

The present invention permits hot skinning without loss of the advantages of cold skinning. In carrying out the present invention, a calf carcass is skinned on the dressing rail before the animal heat has been dissipated and promptly thereafter the outer surface of the carcass is wrapped with cloth. We prefer that the cloth be wet with brine which is a sodium chloride water solution of from 5 degree to 20 degree salometer reading strength. The cloth is tightly and smoothly applied on the skinned surfaces of the carcass and fastened in any appropriate manner. After the carcass has been wrapped in cloth, it is covered with a wrapping material impervious to air and moisture, such as waxed paper, moistureproof paper, moistureproof cloth or any other moistureproofing material. It is preferable to completely envelop the carcass in the moistureproof material. In any event, the moistureproof material should cover the clothed skinned surfaces of the calf carcass and be secured in close intimate contact with the brine moistened cloth. The moistureproof material may be held in place by any suitable means. A convenient method is to apply stockinette bags which, being elastic, will hold the moistureproof material such as waxed paper tightly against the cloth beneath, which is preferably wet or moist.

It will be seen that the present method permits the removal of the hide while the calf carcass is hot, as a part of the original dressing operation whereby the calf carcass need not be sent to the cooler with the hide on.

The present invention permits the hot skinning of calves and results in a calf carcass which is equal in appearance and surface condition to a cold skinned carcass immediately after the skin has been removed. Brine, of course, has a mild sterilizing action. The cloth wicks up sufficient moisture from the surface of the carcass to prevent the formation of slime. The moistureproof material acts to prevent dehydration and the combination of the cloth and the waxed paper retards the chill and approximates nature's hide in this respect.

We claim:

1. The method of treating calf carcasses which comprises hot skinning a calf carcass, applying a brine moistened cloth in intimate contact with the skinned meat surface promptly after skinning of the meat surface and before dissipation of the animal heat and encasing the clothed carcass in a moistureproof covering in intimate contact with the cloth covering.

2. The method of treating calf carcasses which comprises hot skinning a calf carcass, applying a brine moistened cloth in intimate contact with the skinned meat surface promptly after skinning of the meat surface and before dissipation of the animal heat and encasing the clothed carcass in a waxed paper covering in intimate contact with the cloth covering.

3. The method of treating calf carcasses which comprises hot skinning a calf carcass, applying a cloth moistened with a five degree to twenty degree salometer reading strength brine solution in intimate contact with the skinned meat surface promptly after skinning of the meat surface and before dissipation of the animal heat and encasing the clothed carcass in a moistureproof covering in intimate contact with the cloth covering.

4. The method of treating calf carcasses which comprises hot skinning a calf carcass, applying a cloth moistened with a five degree to twenty degree salometer reading strength brine solution in intimate contact with the skinned meat surface promptly after skinning of the meat surface and before dissipation of the animal heat and encasing the clothed carcass in a waxed paper covering in intimate contact with the cloth covering.

5. The method of treating calf carcasses which comprises hot skinning a calf carcass, applying a brine moistened cloth in intimate contact with the skinned meat surface promptly after skinning of the meat surface and before dissipation of the animal heat, encasing the clothed carcass in a moistureproof covering and stockinetting the clothed, moistureproof covered carcass whereby the moistureproof covering will be held in intimate contact with the cloth covering.

6. The method of treating calf carcasses which comprises hot skinning a calf carcass and promptly after skinning of the meat surface and before dissipation of the animal heat applying a brine moistened cloth in intimate contact with the skinned meat surface and encasing the clothed carcass in a moistureproof covering in intimate contact with the cloth covering.

7. The method of treating calf carcasses which comprises hot skinning a calf carcass and promptly after skinning of the meat surface and before dissipation of the animal heat applying a brine moistened cloth in intimate contact with the skinned meat surface and encasing the clothed carcass in a waxed paper covering in intimate contact with the cloth covering.

BEVERLY E. WILLIAMS.
ANDREW S. HARTANOV.